United States Patent
Brücker et al.

(10) Patent No.: US 6,209,844 B1
(45) Date of Patent: Apr. 3, 2001

(54) ARRANGEMENT FOR SUPPORTING AN EXHAUST SYSTEM ON A MOTOR VEHICLE

(75) Inventors: Iris Brücker, Stuttgart; Heiko Gensert, Eppstein, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/360,870

(22) Filed: Jul. 23, 1999

(30) Foreign Application Priority Data

Jul. 23, 1998 (DE) ............................................. 198 33 160

(51) Int. Cl.[7] .................................................... F16M 13/00
(52) U.S. Cl. .......................... 248/610; 248/58; 248/634; 248/589; 248/573; 248/59; 248/70
(58) Field of Search .............................. 248/610, 58, 634, 248/589, 59, 573, 70, 73

(56) References Cited

U.S. PATENT DOCUMENTS

| | | | |
|---|---|---|---|
| D. 316,957 | * | 5/1991 | Kent ...................................... D8/373 |
| 2,609,837 | * | 9/1952 | Enander ................................. 138/46 |
| 2,912,198 | | 11/1959 | Fell, Jr. .................................. 248/54 |
| 3,270,992 | * | 9/1966 | Cassel ................................... 248/60 |
| 4,339,919 | * | 7/1982 | Jobling et al. ........................ 248/610 |
| 4,638,965 | * | 1/1987 | De Bruine et al. ..................... 248/59 |
| 4,828,533 | * | 5/1989 | Focqueur et al. ........................ 464/24 |
| 4,893,778 | * | 1/1990 | Drabing et al. ....................... 248/610 |
| 5,649,685 | * | 7/1997 | Keller ................................... 248/638 |

FOREIGN PATENT DOCUMENTS

| | | |
|---|---|---|
| 42 07 583 | 9/1993 | (DE) . |
| 44 40 188 | 5/1995 | (DE) . |
| 44 17 651 | 10/1995 | (DE) . |
| D. 502776 | 3/1989 | (GB) . |

* cited by examiner

Primary Examiner—Leslie A. Braun
Assistant Examiner—A. Joseph Wujciak
(74) Attorney, Agent, or Firm—Klaus J. Bach

(57) ABSTRACT

In an arrangement for supporting an exhaust system on a motor vehicle, a mounting element is connected to a motor vehicle part, a support element is pivotally connected to the mounting element, and an intermediate retaining means, which is connected to the exhaust system, is pivotally supported by the support element, the pivot axes of the support element and the mounting element and of the intermediate retaining means are parallel and disposed in spaced relationship and so oriented that the support element is pivotable in the longitudinal direction of the exhaust system so as to permit expansion of the exhaust system.

10 Claims, 2 Drawing Sheets

ARRANGEMENT FOR SUPPORTING AN EXHAUST SYSTEM ON A MOTOR VEHICLE

BACKGROUND OF THE INVENTION

The invention relates to an arrangement for supporting an exhaust system on a motor vehicle by way of a support element.

Such a support arrangement is disclosed, for example, in DE 44 40 188 A1. An object of this arrangement is to accommodate the substantial thermal expansion of the exhaust system.

However, the known arrangement is a relatively complicated construction, so that it is very difficult to install. Furthermore, the arrangement described in the above document can not be removed without being damaged so that the support elements have to be replaced each time the exhaust system is exchanged.

A further arrangement for mounting an exhaust system to a motor vehicle is known from U.S. Pat. No. 2,609,837. In this case, a retaining means is fastened to the exhaust system by way of a sleeve and can be pivoted in relation to a further retaining means.

However, this arrangement is designed for use in motorbikes and cannot be used in motor vehicles for the purpose of accommodating the thermal expansion of an exhaust system.

With regard to the general prior art relating to arrangements for mounting an exhaust system to a motor vehicle, reference is further made to DE 44 17 651 C1 and DE 42 07 583 A1.

The object of the present invention is to provide an arrangement for elastically mounting an exhaust system to a motor vehicle, whereby the thermal expansion of the exhaust system can be accommodated, and which ensures good lateral guidance of the exhaust system and by which the exhaust system can be mounted to the motor vehicle in a stress-free manner.

SUMMARY OF THE INVENTION

In an arrangement for supporting an exhaust system on a motor vehicle, a mounting element is connected to a motor vehicle part, a support element is pivotally connected to the mounting element, and an intermediate retaining means, which is connected to the exhaust system, is pivotally supported by the support element, the pivot axes of the support element and the mounting element and of the intermediate retaining means being parallel and disposed in spaced relationship and so oriented that the support element is pivotable in the longitudinal direction of the exhaust system so as to permit expansion of the exhaust system.

The connection of the exhaust system to the mounting element via the intermediate support element provides for a double joint which can absorb the thermal expansion of the exhaust system in a pivotal movement of the support element in the longitudinal direction of the exhaust system. The support element can be deflected freely if the exhaust system changes its length, since the support element may rotate in relation to the intermediate retaining means.

Preferably, the mounting element consists of an elastomer material, whereby vibrations occurring in the exhaust system are not transmitted to the motor vehicle. It is advantageous to use a large amount of elastomer material for the mounting element with the result that the vibrations are effectively damped.

It is further advantageous if the retaining element is connected to the intermediate retaining means via a spring arrangement.

The spring arrangement provides for the support element to be safely joined to the intermediate retaining means such that the two parts can pivot with respect to one another without rattling noises when they move relative to one another.

Further advantageous embodiments of the invention will become apparent from the following description thereof, shown, by way of example, in accompanying drawings.

DESCRIPTION OF A PREFERRED EMBODIMENT

Figure 1:
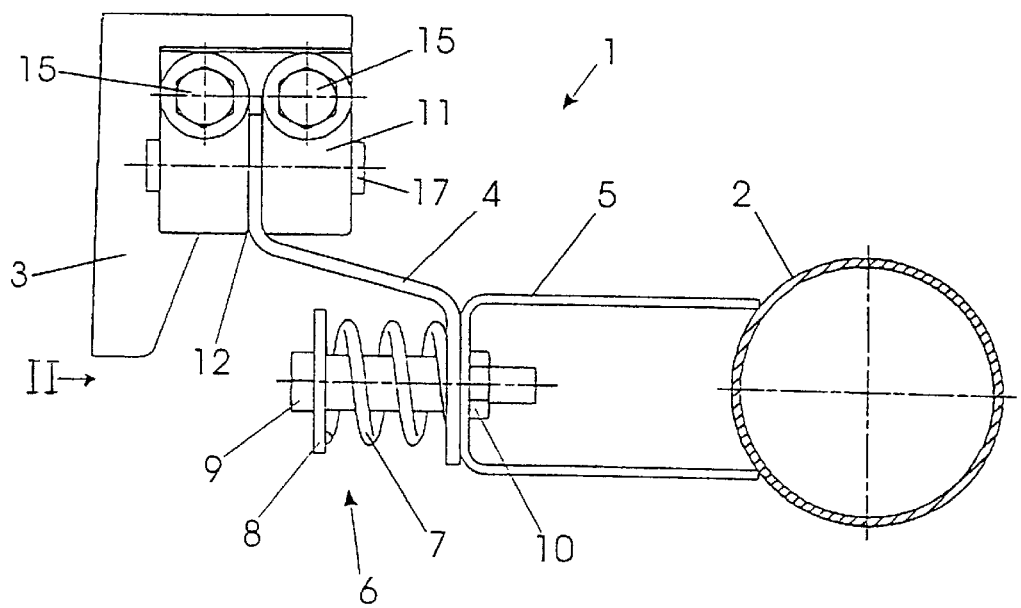
FIG. 1 shows the exhaust system arrangement according to the invention.

FIG. 1 shows an arrangement for 1 for resiliently supporting an exhaust system 2 on a motor vehicle part 3, e.g. a body part. Provided for this purpose are a support element 4 and an intermediate retaining means 5, which is connected to the exhaust system 2, for example, by welding. The support element 4 consists of a sheet metal strip with two bent-over end portions such that it has the form of an S or Z. The intermediate retaining means 5 is U-shaped with both legs connected, preferably welded, to the exhaust system 2. Alternatively, it would also be possible for the intermediate retaining means 5 to be connected to the exhaust system 2 via a clamp.

The support element 4 is connected to the intermediate retaining means 5 via a spring structure 6, which includes a helical spring 7, a pressure ring 8 mounted on a bolt 9 and a nut 10 threaded onto the bolt 9. The bolt 9 extends through bores in the support element 4 and the intermediate retaining means 5. At the intermediate retaining means 5, the nut 10 is screwed onto the bolt 9 and at the support element 4, the pressure-exerting ring 8 is located at the head of the bolt 9. The helical spring 7 is arranged between the pressure ring 8 and the support element 4, and the helical spring 7 of the spring structure 6 thus applies a force which presses the support element 4 and the intermediate retaining means 5 together. The spring engagement force can be changed by adjusting the nut 10. The spring structure 6 ensures that the support element 4 and the intermediate retaining means 5 can not generate any rattling noises when they are moved with respect to one another. Furthermore, the support element 4 is thus provided with good lateral guidance and can only pivot in the longitudinal direction of the exhaust system 2.

At its end, remote from the spring structure 6, the support element 4 is received in a mounting element 11. The mounting element 11 has a slot 12, which extends in the longitudinal direction of the exhaust system 2 and in which one end of the support element 4 is received. The mounting element 11 consists of an elastomer material and comprises two parts with a basic body 13 and a closure part 14. In this case, the basic body 13 is U-shaped and the closure part 14 is located between the two legs of the basic body 13. Instead of the two-parts, the mounting element 11 comprising the basic body 13 and the closure part 14, the closure part 14 could be connected to the basic body 13 at one side such that, for closure purposes, it can be pivoted between the legs of the basic body 13.

In this case, the mounting element 11 has two screws 15 extending therethrough, by which the mounting element 11 is fastened to the motor vehicle part 3. Of course, the mounting element 11 can be fastened to the motor vehicle part 4 in other ways.

Figure 2:
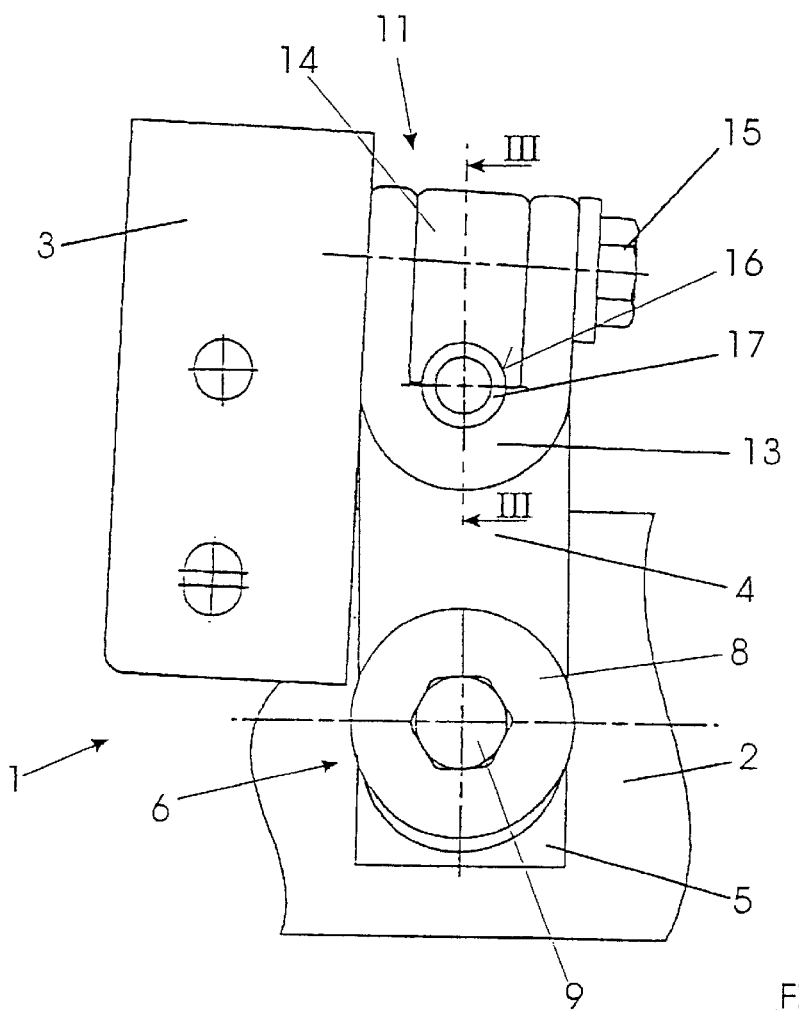
FIG. 2 is a side view of the arrangement according to the invention seen from the left side as indicated by the arrow II in FIG. 1.
Figure 3:
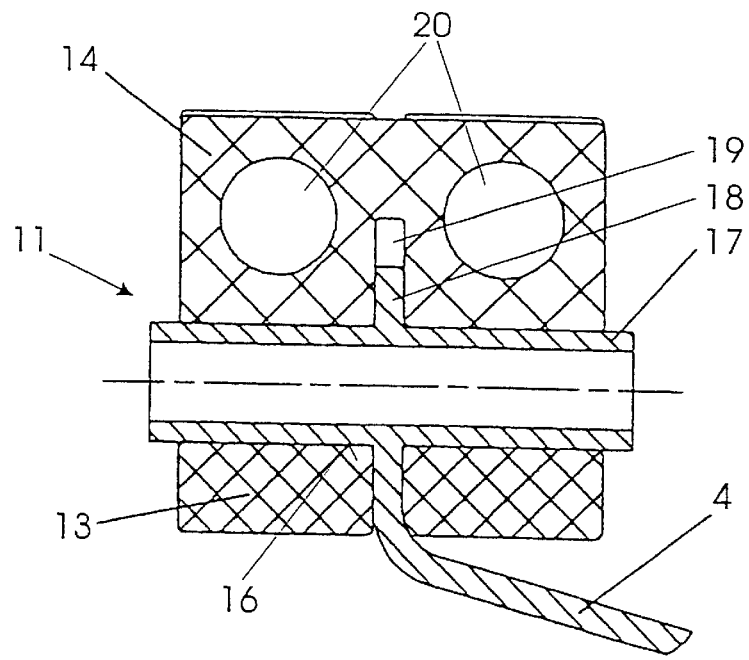
FIG. 3 shows a sectional view taken along line III—III of FIG. 2.

As is illustrated in FIG. 2, at the jointure of the basic body 13 and the closure part 14, the mounting element 11 has a bore 16, which extends perpendicularly to the slot 12, and in which a cylindrical, or tubular part 17 which is connected to the support element 4 is rotatably supported. As a result, the support element 4 is pivotally supported in the mounting element 11. The tubular part 17 and the bore 16 of the mounting element 11 can be seen more clearly in the sectional view of FIG. 3. FIG. 3 also illustrates that the tubular part 17 is provided with a semi-annular or partially annular protrusion 18, which is mounted in a semi-annular or partially annular slot 19 in the closure part 14 of the support element 11. The protrusion 18 improves the lateral guidance of the support element 4 in the mounting element 11.

Bores 20 for receiving bolts 15 are shown in FIG. 3 to be disposed above the bore 16. However, the bores 20 and the bolts 15 may also be disposed beneath the bore 16. In this case, the support element 11 would be subjected by the weight of the exhaust system to compressive loading rather than tensile loading. This could also prevent possible sagging of the exhaust system 2 caused by its weight.

Figure 4:
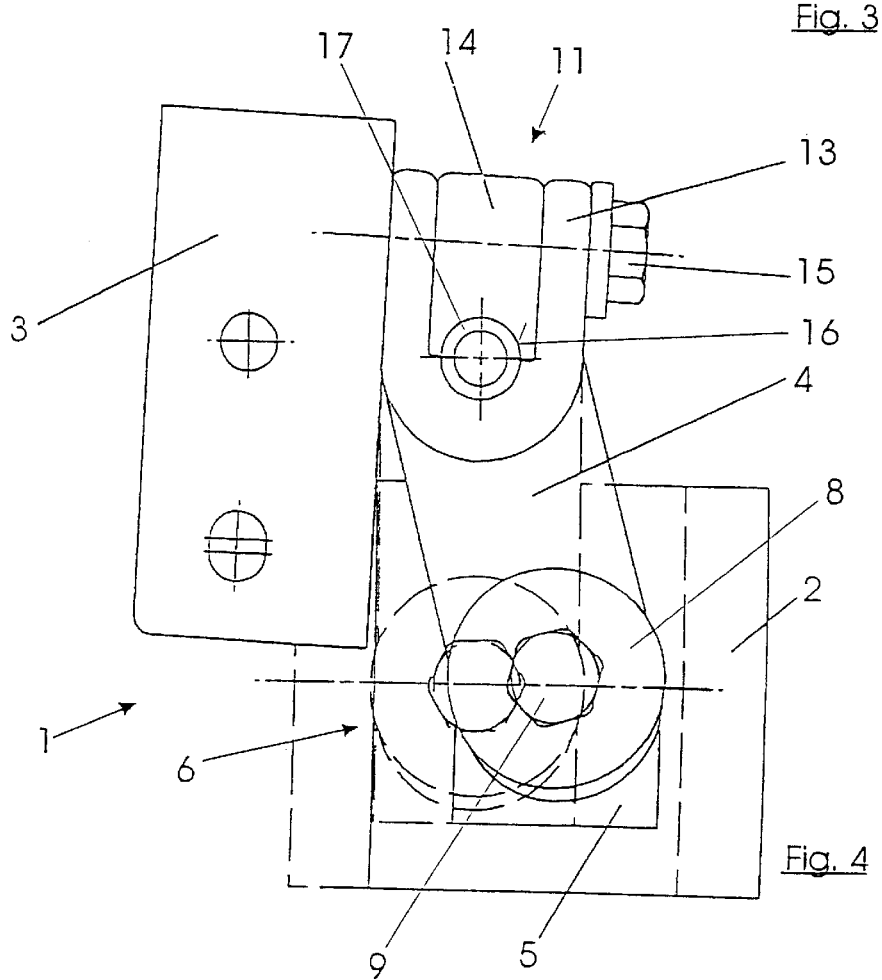
FIG. 4 shows a view like that of FIG. 2, wherein the retaining element is shown in a deflected position.

FIG. 4 illustrates the support element 4 in its deflected state, which is caused by an elongation of the exhaust system 2 as a result of thermal expansion. The solid lines illustrate the deflected state of the support element 4, and the dashed lines illustrate it non-deflected state, as it is illustrated in FIG. 2. The pivot axes of the support element 4 with respect to the mounting element 11 and the intermediate retaining means 5, which axes are not depicted in the figures, are parallel to, and spaced from, each other so that the support element 4 is capable of pivoting, as described above, in the longitudinal direction of the exhaust system 2. FIG. 4 also shows the support element 4 pivoted in relation to the intermediate retaining means 5, which, as has been described above, is permitted by the spring structure 6.

As an alternative to the embodiment illustrated in FIG. 1, the spring structure 6 could also be mounted on the side of the intermediate retaining means 5 or on both sides of the support element 4 and/or of the intermediate retaining means 5. Furthermore, it would also be possible to use a leaf spring, a Belleville spring or a set of Belleville springs or other types of springs as spring element 7. A spring structure 6 consisting of an elastomer material may also be used.

What is claimed is:

1. An arrangement for supporting an exhaust system extending on a motor vehicle in the longitudinal direction thereof, said arrangement comprising a mounting element adapted to be connected to a part of said motor vehicle and said mounting element comprising two components, a basic body and a closure, with a bore being located between said basic body and said closure components, a support element having a tubular part disposed in said bore so as to be pivotally connected to said mounting element, an intermediate retaining means pivotally supported by said support element, the pivot axes of said support element with respect to said mounting element and said intermediate retaining means being parallel and disposed in spaced relationship and arranged such that said support element is pivotable in said longitudinal direction so as to permit expansion of said exhaust system.

2. The arrangement according to claim 1, wherein said mounting element consists of an elastomer material.

3. The arrangement according to claim 1, wherein said support element is connected to said intermediate retaining means by way of a spring structure arranged on at least one side of said support element and said intermediate retaining means.

4. The arrangement according to claim 3 wherein said spring structure is provided with a bolt which acts on a spring element so as to bias said support element into engagement with said intermediate retaining means.

5. The arrangement according to claim 4, wherein said spring structure comprises at least one helical spring.

6. The arrangement according to claim 4, wherein said spring structure comprises at least one Belleville spring.

7. The arrangement according to claim 3, wherein said spring structure consists of an elastomer material.

8. The arrangement according to claim 1, wherein said support element is formed by a flat material bent in the form of an "S" shape and is mounted pivotally in a slot of said mounting element 11.

9. The arrangement according to claim 1, wherein said tubular part is provided with a projection which extends into a slot in said mounting element.

10. The arrangement according to claim 1, wherein said mounting element is screwed to the motor vehicle part.

\* \* \* \* \*